Patented Oct. 28, 1924.

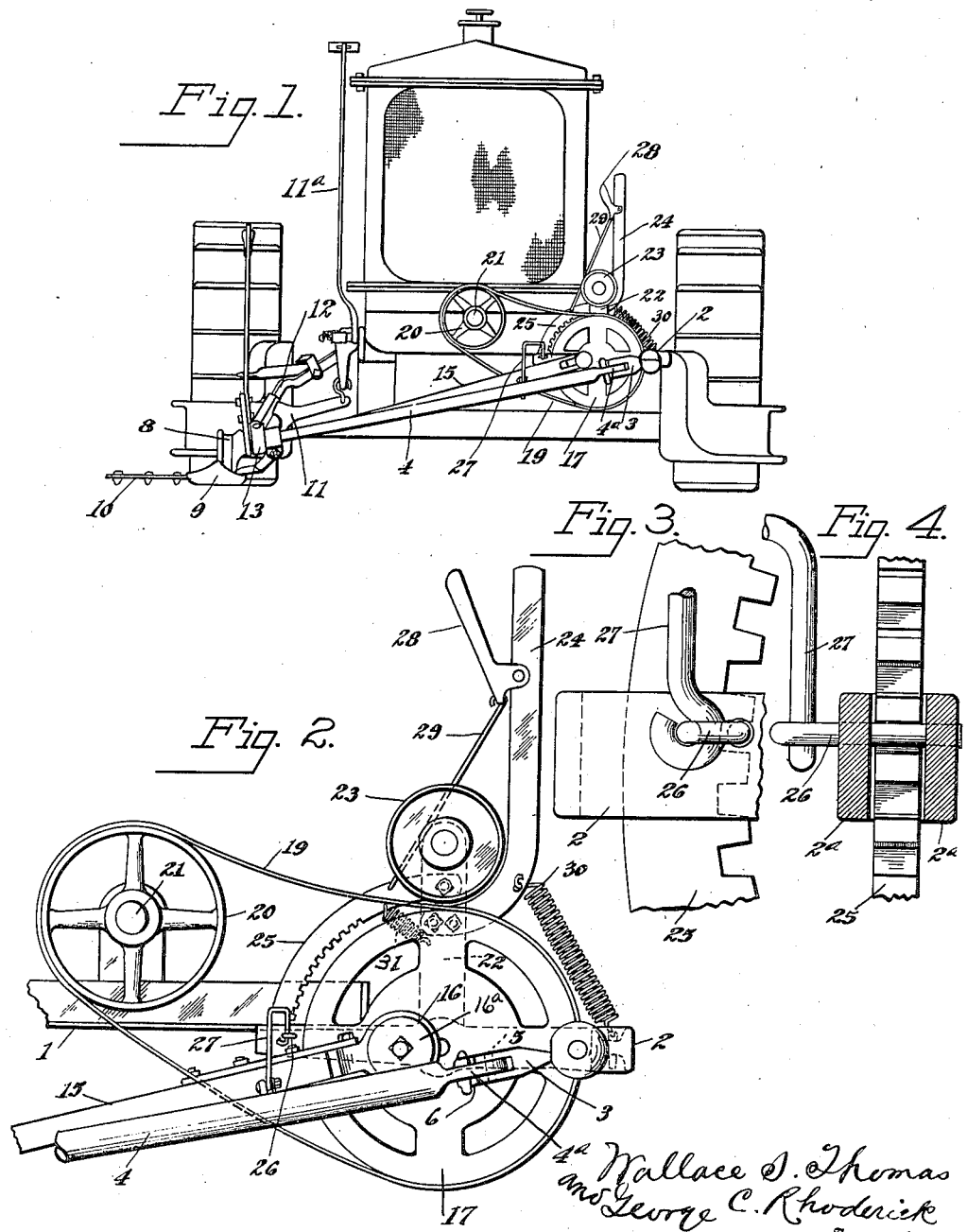

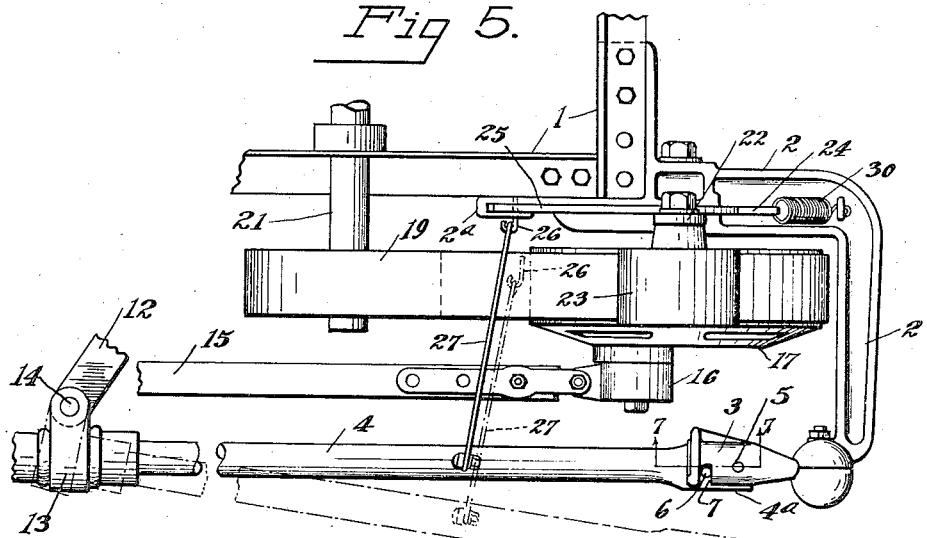
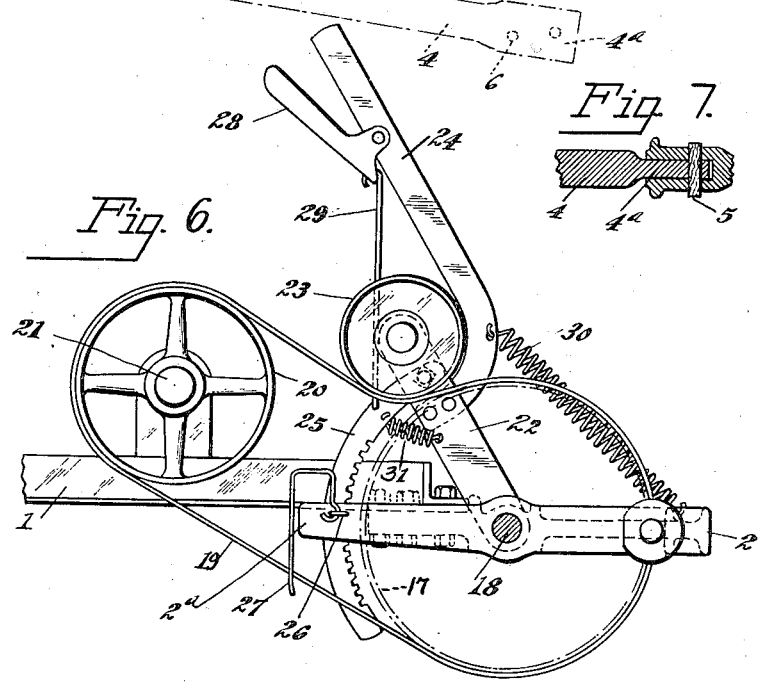

1,512,956

UNITED STATES PATENT OFFICE.

WALLACE S. THOMAS AND GEORGE C. RHODERICK, OF SPRINGFIELD, OHIO, ASSIGNORS TO THE THOMAS MANUFACTURING COMPANY, OF SPRINGFIELD, OHIO, A CORPORATION OF OHIO.

MOWING-MACHINE ATTACHMENT FOR TRACTORS.

Application filed December 5, 1921. Serial No. 520,113.

*To all whom it may concern:*

Be it known that we, WALLACE S. THOMAS and GEORGE C. RHODERICK, citizens of the United States, residing at Springfield, in the county of Clark and State of Ohio, have invented certain new and useful Improvements in Mowing-Machine Attachments for Tractors, of which the following is a specification.

Our invention relates to improvements in mowing machine attachments for tractors.

The object of the invention is to provide improved means for throwing the actuating mechanism for the cutting devices into and out of operation, including means for automatically rendering the actuating devices inoperative in the event that the cutting devices meet an obstruction.

In the accompanying drawings:—

Fig. 1 is a front elevation of a tractor showing our improved attachment applied thereto.

Fig. 2 is a front elevation of a portion of the same on an enlarged scale showing the actuating parts in a position of rest.

Fig. 3 is an enlarged detail of the forward side of a part of the throw out devices for the actuating mechanism.

Fig. 4 is an end view of the parts shown in Fig. 3.

Fig. 5 is a top plan view of a portion of the attachment.

Fig. 6 is a front elevation of some of the mechanism shown in Fig. 2 showing the same in operative position, one of the driving pulleys being indicated in dotted lines to better show some of the parts.

Fig. 7 is a section on the line 7—7 of Fig. 5.

Referring to the drawings, 1 represents a portion of the frame of a tractor to which is bolted a bracket 2 which extends laterally and forwardly. To the forward end of this bracket 2 is secured by a ball and socket joint one member 3 of a coupling frame, the other member 4 of which has a tongue 4ª which extends into a groove in the member 3 and is connected therewith by a wooden pin 5; the tongue 4ª being further provided with oppositely extending pins 6 which project into recesses 7 in the frame part 3 for the purpose of guiding the members in assembling the same. The grassward end of the frame member 4 has secured thereto a yoke 8 to which is pivotally connected a shoe 9 which carries the cutting devices 10, this particular arrangement being well known in mowing machines. A bell crank lever 11 having one arm thereof connected with a foot lever 11ª and the other arm arranged to engage the shoe on one side of the pivotal point thereof, furnishes the means for elevating the cutting devices in a well known way. The grassward end of the coupling frame member 4 is pivotally connected with a bracket 12 projecting forwardly from the frame of the tractor through the medium of a collar 13 and vertically extending pivot pin 14 to permit this frame member 4 to swing to the position shown in dotted lines in Fig. 5, in the event that the cutting devices should meet with an obstruction, in which event the wooden pin 5 is sheared, thus disconnecting the coupling frame members 3 and 4.

The knife of the cutting devices is reciprocated by a pitman 15 pivotally connected with a collar 16 journaled on an eccentric pin 16ª on a pulley 17, journaled on a stationary shaft or stud 18 which is supported by and projects forwardly from the bracket 2, this pulley 17 being driven by a belt 19, when tightened in the manner to be described, from a second pulley 20 which is secured to the end of the crank shaft 21 of the tractor. Means are provided for tightening the belt by devices which may be automatically released to release the tension of the belt in the event that the cutting devices should be swung to inoperative position by an obstruction. Pivoted on the shaft 18 is an arm 22 on the upper end of which is journaled an idler pulley 23. Rigidly connected to the arm is a hand lever 24 and pivotally connected therewith is a curved rack 25. This rack projects through a bifurcated extension 2ª of the bracket 2 and projecting through aligned perforations in the arms of this extension 2ª is a pin 26 with which the teeth of the rack engage to hold the arm 22 in the position to which it has been adjusted by the hand lever 24; a spring 31 attached to the rack and to the hand lever serving to hold the rack teeth in yielding engagement with the pin and permit the teeth to ratchet over the pin when the arm 22 is rocked to bring the idler pulley in contact with the belt to tighten the same. A small lever 28 pivoted to the hand lever 24 and connected to the rack 25 by the link 29 furnishes the means for manually releasing the rack from the pin to permit the lever to withdraw the idler pulley from the belt.

In order to automatically release the rack when the cutting devices meet an obstruction sufficient to sever the pin 5 and permit the parts to swing to the dotted line position shown in Fig. 5, the frame member 4 is connected to the pin 26 by a link 27 which withdraws the pin from the frame part 2ª and thereby releases the rack; a spring 30 attached to the lever 24 and to the bracket 2 serving to withdraw the idler pulley from the belt.

By this arrangement it will be seen that the idler pulley is held positively in engagement with the belt and its position with relation thereto adjusted so as to place and maintain the desired degree of tension upon the belt to insure a good driving connection for the operating parts, the spring 30 serving simply to withdraw the idler pulley from the belt.

Having thus described our invention, we claim:—

1. In a mowing machine, a frame, a member arranged transversely of the frame, means for pivotally sustaining said member at its grassward end, means including a breakable connection for normally sustaining said member at its stubbleward end, cutting devices including a reciprocating knife carried at the grassward end of said member, driving devices for said knife, the stubbleward end of said member being caused to swing forwardly when said breakable connection is severed by undue strain on said cutting devices, and means operated by the movement of said member for throwing said driving devices out of operation.

2. In a machine of the character described, a main frame, a coupling member consisting of a grassward part and a stubbleward part, means for swivelly supporting the stubbleward part of said member on said frame, means for pivotally supporting the grassward part of said member on said frame, the parts of said coupling member being connected together by a breakable connection, cutting devices carried by the grassward part of said member, driving mechanism for the knife of said devices, and means operated by the movement of the grassward part of said coupling member for throwing said driving devices out of operation when the connection between the parts of said coupling member is broken by undue strain on the cutting devices.

3. In a machine of the character described, a frame, a support pivoted on said frame, cutting devices carried thereby, said support being capable of moving about its pivotal point by undue strain upon said cutting devices, a drive pulley, a driven pulley having a connection with said cutting devices, a normally loose belt about said pulleys, a device for tightening said belt comprising means for positively holding the same in engagement therewith, including a detent, and means operable by the movement of said support for causing said detent to release said holding means, and a spring for withdrawing said tightening device.

4. In a machine of the character described, a frame, a support pivoted on said frame, cutting devices carried by said support, said support being capable of being moved about its pivotal point by undue strain brought upon said cutting devices, a drive pulley, a driven pulley connected with said cutting devices, a normally loose belt about said pulleys, an idler pulley, means for positively holding said idler pulley in engagement with said belt to tighten the same about said driven and drive pulleys including a detent, means operable by the movement of said support for causing said detent to release said holding means, and a spring for retracting said idler pulley.

5. In a machine of the character described, a frame, a support pivoted on said frame, cutting devices carried by said support, said support being capable of being moved about its pivotal point by undue strain brought upon said cutting devices, a drive pulley, a driven pulley connected to said cutting devices, a normally loose belt about said pulleys, an arm pivoted on said frame, an idler pulley carried by said arm, a rack carried by said arm, a detent for said rack to hold said idler pulley in operative relation with said belt, a connection between said pivoted support and said detent to cause the detent to release said rack by a movement of said support from normal, and a spring for retracting said arm.

In testimony whereof we have hereunto set our hands this 21st day of November, 1921.

WALLACE S. THOMAS.
GEORGE C. RHODERICK.